United States Patent [19]

Hain et al.

[11] 4,108,057
[45] Aug. 22, 1978

[54] DEVICE FOR CONTINUOUS PRODUCTION OF CHEESE MATERIAL

[75] Inventors: Gottfried Hain, Lehen; Günter Dohle; Josef Geist, both of Rott, Inn; Rainer Schmidt, Lehen Nr. 5, all of Fed. Rep. of Germany

[73] Assignee: Alpma Alpenland Maschinenbau Hain and Co. K.G., Fed. Rep. of Germany

[21] Appl. No.: 652,949

[22] Filed: Jan. 28, 1976

[51] Int. Cl.² .................. A01J 25/16; A23C 19/02
[52] U.S. Cl. .................................... 99/452; 99/460; 426/36
[58] Field of Search ............. 99/452, 453, 460, 461, 99/483; 426/34, 36, 38

[56] References Cited

U.S. PATENT DOCUMENTS

| | | | |
|---|---|---|---|
| 2,324,636 | 7/1943 | Miollis | 426/36 |
| 3,210,845 | 10/1965 | Radema et al. | 99/453 |
| 3,482,507 | 12/1969 | Richardson et al. | 99/452 |
| 3,859,453 | 1/1975 | Bronkhorst | 99/452 |
| 3,918,356 | 11/1975 | Fisher et al. | 99/452 |

*Primary Examiner*—Harvey C. Hornsby
*Assistant Examiner*—John M. Jillions
*Attorney, Agent, or Firm*—William Anthony Drucker

[57] ABSTRACT

The disclosure relates to a device for the continuous production of cheese material through coagulation of milk, comprising a horizontal trough-shaped container, whose ends extend funnel-shaped toward the flattened face edges, a flexible inner wall covering the container wall on the inside, which inner wall can be displaced along the wall of the container and runs as endless band around the face edges of the container, a device for feeding at the inlet and a predetermined amount of milk suitably pretreated for the manufacture of cheese, a transportation of such introduced milk from such inlet end to the outlet end by means of the flexible inner wall at such a velocity that during such a displacement inside the container the milk coagulates to a coagulate which can be cut and, further, comprising a cutting device at the outlet end of the container for cutting the coagulate to cheese curd, which is removed by the rotating inner wall over the face edge at the outlet end of the container for the purpose of further processing.

9 Claims, 8 Drawing Figures

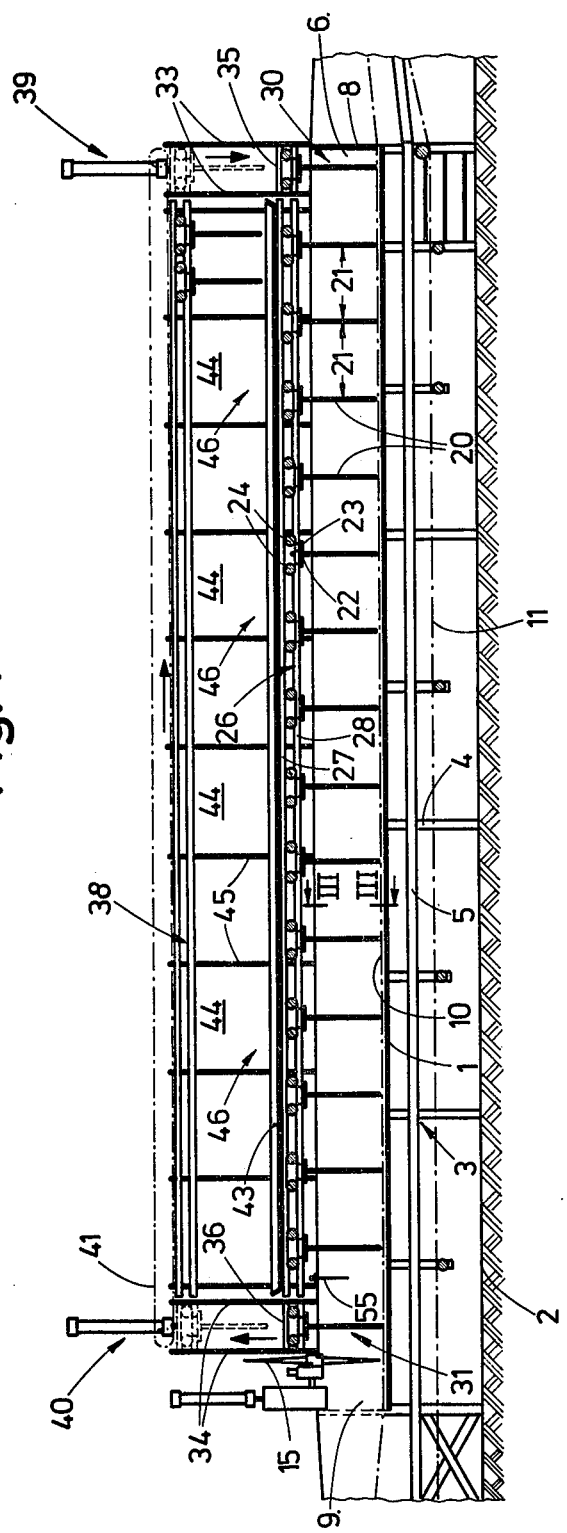

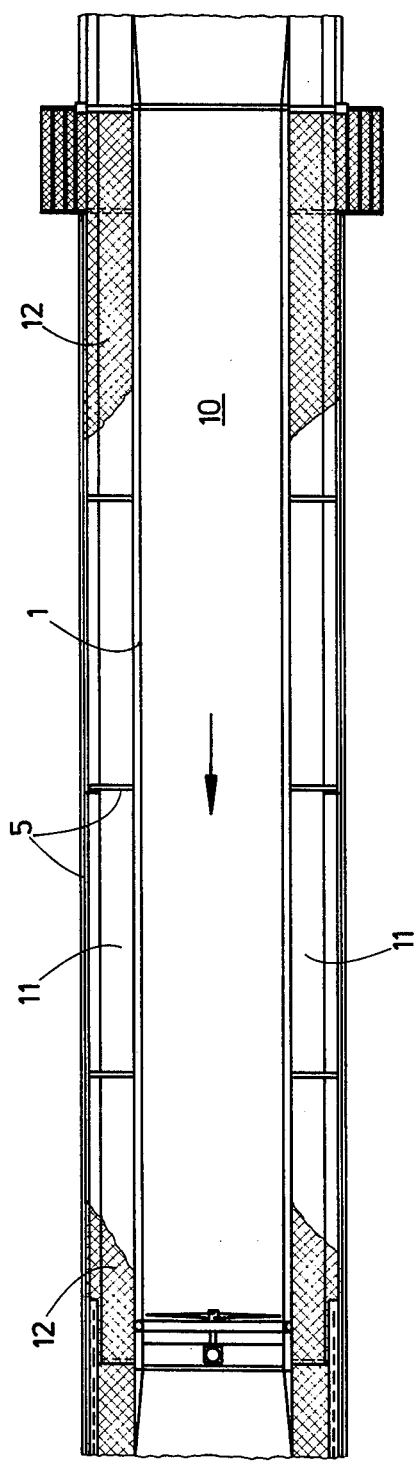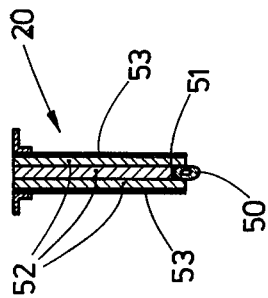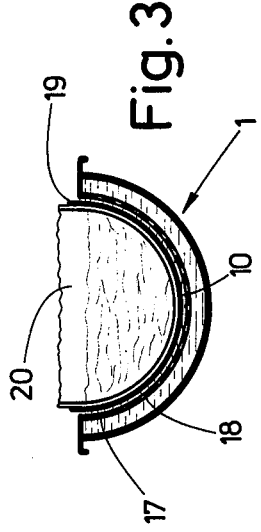

DEVICE FOR CONTINUOUS PRODUCTION OF CHEESE MATERIAL

The invention relates to a device for the continuous production of cheese material through coagulation of milk, comprising a horizontal trough-shaped container, whose ends extend funnel-shaped toward the flattened face edges, a flexible inner wall covering the container wall on the inside, which inner wall can be displaced along the wall of the container and runs as an endless band around the face edges of the container, a device for feeding at the inlet end a predetermined amount of milk suitably pretreated for the manufacture of cheese, a transportation of such introduced milk from such inlet end to the outlet end by means of the flexible inner wall at such a velocity that during such a displacement inside the container the milk coagulates to a coagulate which can be cut and, further, comprising a cutting device at the outlet end of the container for cutting the coagulate to cheese curd, which is removed by the rotating inner wall over the face edge at the outlet end of the container for the purpose of further processing.

In the known device of the German Pat. No. 1,810,154 it is not possible to avoid the formation of eddies when the milk is introduced into the container, the eddies exerting a detrimental effect on the steadying or calming of the milk for the purpose of formation of coagulate. Besides, the fed milk is mixed with the milk which is already coagulated. However, a uniform and intensive coagulation for producing a homogeneous coagulate at the outlet of the container can be attained only in the case where the rest state in the milk and in the formed coagulate can be maintained during the entire advance.

A further deficiency consists in the fact that the mixture of cheese curd and whey formed through the cutting of the coagulate must be moved upward over a rising surface to the face edge and a back-pressure or backwash on the coagulate, not yet cut, is exerted in this connection. Such a back-pressure effect can not be counteracted by the known cutting tool.

Accordingly, an object of the invention is to provide a coagulator comprising a movable inner wall for the continuous formation of coagulate, which coagulator guarantees a rapid steadying or calming of the fed milk.

A further object of the invention is to prevent largely a mixing of milk quantities with other quantities possessing a different state of coagulation.

A further object of the invention is to be seen in that the back-pressure of the rising mixture of cheese curd and whey, which cannot be avoided at the outlet end of the container, should, as much as possible, not exert its effect on the coagulate which is not yet cut.

Finally, a further object of the invention is to secure a continuous cutting of the coagulate.

In order to solve these problems, there is provided a device of the above-mentioned kind, which is characterized according to the invention in that there are provided partitions comprising an outline that fits the cross section of the container, which partitions are immersed into the container at the inlet end thereof, one after another, and spaced in relation to each other, displaced together with the inner wall of the container and subdivide in this manner the container space into a number of uniformly displaced steadying chambers, further in that, at the latest, at the outlet end in front of the cutting device, there is provided a device which again lifts the partitions from the container and brings them into a return channel.

Due to the subdivision of the container space into steadying chambers, the flows and eddy formations of the milk, that cannot be avoided during the introduction thereof, are limited to the first steadying chambers and the introduced milk immediately attains the state of rest desired for the coagulation, which state is retained also during the following advance through the entire length of the container. The subdivision of the container space also prevents the intermixing of milk and coagulate fractions possessing different states, i.e., the contents of the container form a homogeneous and uniformly coagulated mass in any cross sectional area.

If the steadying chambers are retained through the entire length of the container, i.e., up to the cutting tool, the back-pressure effect of the cut mixture of cheese curd and whey can still exert its action only on the last steadying chamber. However, such back-pressure effect is still largely reduced, if the cutting member consists of a screw cutter that rotates about the longitudinal axis of the container.

A rail guide arranged along the container has turned out as particularly advantageous for the guiding of the partitions. The partitions can be forcibly inserted into such a guide at the inlet end and, at the outlet end, the partitions can again be forcibly ejected from the guide. This rail guide is suitably arranged at such a distance from the container that the partitions sit tightly on the inner wall and are displaced by such wall.

Finally, in order to keep the emerging partitions free of adhering coagulate, an electric voltage is applied to the partitions shortly prior to emersion.

Accordingly, the solution of the invention produces not only a filling chamber and, possibly, a following steadying chamber but, also, the areas of coagulation is divided into steadying chambers that are closed in relation to one another, so that the state of rest is secured actually through the entire length of the container. Any interflows and spilling-over movements between and inside the steadying chambers are avoided if the partitions set tightly on the movable inner wall and the latter takes care of the advance. In addition to producing a tight closure, this also provides the most simple solution for the problem of obtaining a synchronous movement between the partitions and the movable wall.

According to a further improvement, the device is provided with a collecting pan, which covers the container and is arranged below the upper return channel. The pan catches the particles dripping from the partitions and protects the coagulate in the container. Further, there exists the possibility of further developing such collecting pan by arranging a cleaning compartment in portions thereof, so that the returning partitions can be subjected to a complete cleaning. In such a case, this installation can be kept in operation continuously day and night.

According to the invention, a screw cutter is provided for the cutting of the coagulate at the outlet end of the container, which cutter can be turned about a shaft extending in the direction of displacement of the coagulate and arranged above the coagulate. The cutter blade of the screw cutter forms a thread which entirely divides the filling space of the container and its cutting edge possesses a spiral shape which extends at an angle of rotation of about 270° from the axis of rotation to the peripheral edge of the cutter blade. The spiral preferably extends within an angle of rotation of about 220–240° proceeding from the axis of rotation to about the half radius of the cutter blade, then it passes through a turning curve and a following straight line toward the peripheral edge of the cutter blade.

Further advantages and features of the invention can be derived from the following description of an exemplified embodiment of a coagulator of the invention, which is shown in the drawings.

FIG. 2 shows a plan view of the container without partitions;

FIG. 3 shows a section along the line III—III of FIG. 1;

FIG. 4 shows a section through a partition;

Figure 1A:
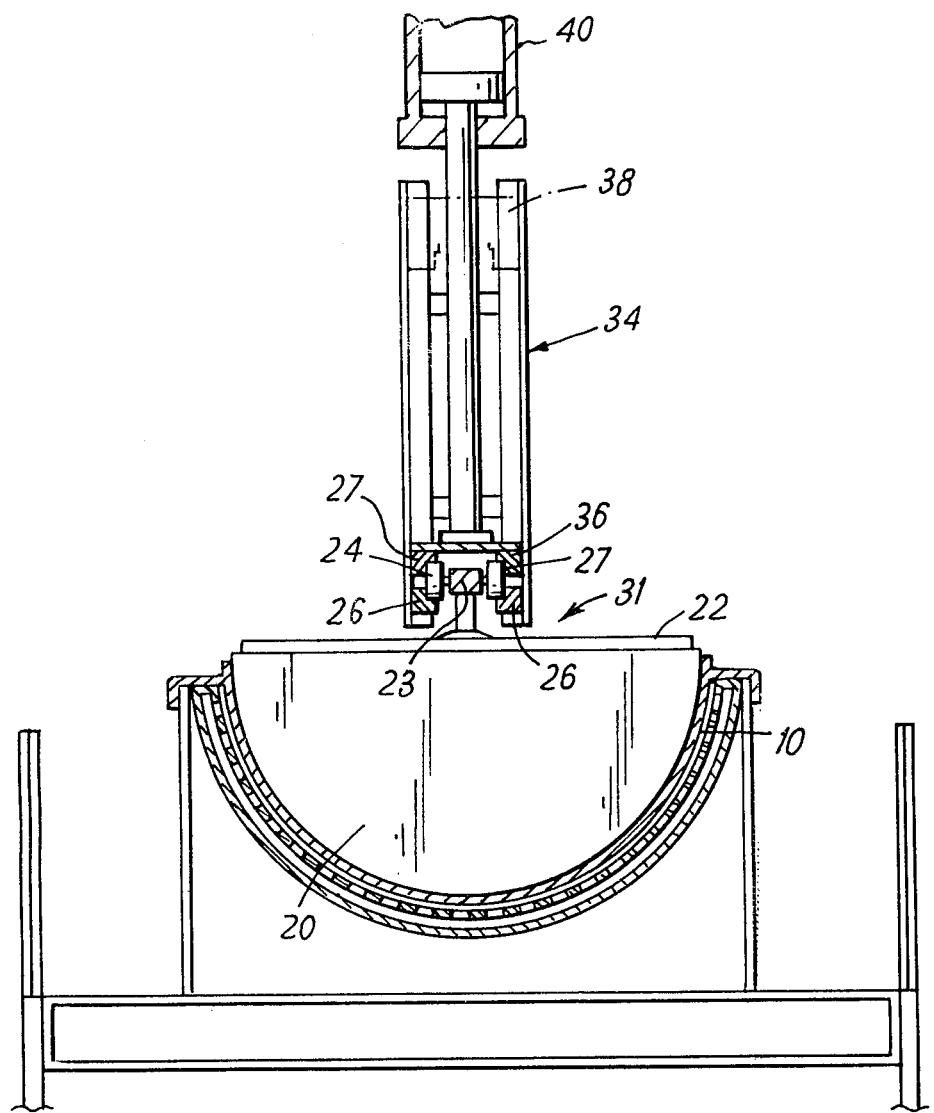
FIG. 1 show a longitudinal section of a coagulator.

A trough-shaped container 1, which forms the coagulator and possesses an approximately semicircular shape, is mounted in a framework 3 resting on a floor 2 and consisting of supports 4 and longitudinal members 5. The container, whose cross section otherwise remains unchanged, is closed at an inlet end 6 by a fixed face wall 8. An outlet end 9 is open. A movable inner wall 10 is situated on the inner surface of the container, the wall consisting of a flexible material. It fits the shape of the container and forms a pan. The inner wall rises at the container ends to flattened face edges and the guide rollers (not illustrated) mounted in such a position. The inner wall is flattened in this connection and supplemented by a portion 11 led under the container, so as to form an endless band. Since lower first portion 11 requires a greater width, passable screens 12 are provided on either side of the container for covering purposes. Inner wall 10 is driven by means of one of the guide rollers. The velocity of motion amounts to about 20–30 cm/min. The milk which is suitably pretreated is introduced into the container at the inlet end. The movable inner wall transports it to the outlet end at such a slow speed that it completely coagulates during the transportation and can finally be cut into cheese curd at the outlet end by a cutting device 15. The cheese curd is then carried out by the inner wall and processed in suitable manner, e.g., to cheese.

As shown in FIG. 3, container 1 is suitably made with double walls. Its inner jacket 17 is equipped with perforations 18, so that a fill, e.g., water, present in the double jacket, can be discharged in order to form a film of lubricant for the inner wall movable in contact with the inner jacket. This provides the possibility of a vibration-free movement of the milk and the coagulate. The inner wall expediently projects somewhat beyond container 1 with its edges 19, so that the water possibly spilled over the edge of the container cannot flow into the pan of the container.

In order that the milk introduced into the container be steadied as soon as possible and that any flow of liquid and mixing movement be stopped, even during the coagulation, partitions 20 project into the container through the entire length thereof from inlet end 6 to cutting device 15 and divide the pan of the container into a number of steadying chambers 21. Each perpendicularly downward extending partition 20 is attached to a traverse 22 which is attached to carriage 23 comprising four rollers 24 on two axles. The carriages are guided in a rail guide 26. In the exemplified embodiment, such rail guide consists of a pair of upper rails 27 and a pair of lower rails 28, the rollers of the carriages moving between such rails. Rail guide 26 is arranged at such a height above the container that partitions 20 guided therein sit tightly, i.e., with a certain contact pressure on movable inner wall 10 and are thus carried along by the wall 10.

The rail guide 26 extends from an immersion station 30 to an emersion station 31. Since the partitions are moved by the movable inner wall, it is not necessary to link the partitions or their carriages. The spacing of the partitions, which need not be uniform, is determined by the feed at immersion station 30. Guide channels 33, 34 are erected above immersion and emersion stations 30 and 31, respectively. The partitions with their carriages, while retaining their vertical position, are shifted in such channels, i.e., downward at 30 and upward at 31. Rail guide extensions 35 or 36 can be lifted and lowered for such a purpose in the guide channels and can be aligned below with rail guide 26 and above with a return rail guide 38. Devices such as hydraulic cylinder 39, 40 are well suitable for the operation of such extensions 35, 36. The immersion and emersion of the partitions can be effected relatively very rapidly. For the return of the partitions, one employs return channel 38 which may be constructed in a manner similar to the rail guide 26. A cable or chain conveyor 41 arranged above the return rail guides takes care of conveying in irregular sequence. The cable or chain conveyor 41 is appropriately running continuously. If there is a partition with its carriage in the lifted rail extension 36 (FIG. 1, dotted) this carriage is engaged by the rotating conveyor 41, is displaced from the rail extension 36 into the return rail guide 38 and in it to its other end. Since such a return is effected relatively swiftly, the partitions are collected on channel 33 at immersion station 30, as seen in FIG. 1 so that a partition is available at any time for the immersion. A mechanism (which is not shown) which becomes operational after certain periods of time thus shifts the partitions at predetermined time intervals into rail guide extension 35 situated in ready position in channel 33, whereafter hydraulic cylinder 39 lowers such an extension so as to place the partition on the movable inner wall of the container, which carries it along, shifts it from the extension over to rail guide 26 and finally displaces it to guide channel 34, wherein again extension 36 receives the partition and the hydraulic cylinder 40 then performs a lifting stroke to the level of the return rail guide 38. Hydraulic cylinders 39 and 40 are operated in accordance with a certain control cycle. The movements of the hydraulic cylinders are limited by stops (not shown), so that the rail extensions 35 and 36 are precisely aligned with the rail guide 26 and the return rail guide 38 at the end of their lifting and lowering movements.

The paritions may be made of synthetic resin, metal or similar material. Since it is important that the partitions be sealed in relation to the movable wall, a partition is expediently provided with a peripheral sealing element 50. A soft, flexible hose of synthetic resin has proved to be effective. As shown in FIG. 4, such a hose is inserted into a peripheral groove 51. Partitions 20 may with advantage be constructed of glue-bonded sheet layers 52, of synthetic resin or the like. Of course, a different sealing element, e.g., a solid body may also be used or it may be attached in a different manner, e.g., through glue-bonding. A hollow element possesses the advantage of special flexibility and adaptibility, especially if one uses compressed air, which can be employed simultaneously for checking the tightness of the hollow hose.

In order to prevent a dripping of liquid particles or similar particles from the returning partitions into the coagulate situated thereunder in the container, a draining pan 43 is provided under the return channel where it also covers the container. Washing and cleaning compartments 46 are established through lateral protecting walls 44, that are erected in certain positions and may be attached, e.g., to braces 45 that carry the return channel. In such compartments one can use hot water, lye, acid, hot air and the like, so that perfectly clean and sterile partitions reach the immersion station. This makes it possible to operate the coagulator in continuous manner, i.e., day and night.

An electrical cleaning device is provided in order to prevent the carrying of adhering coagulate by partitions 20 emerging at the outlet end of the coagulator, insofar as the partitions do not consist of electrically conducting material, they are lined for such a purpose with metal layers, e.g., V2A-steel layers 53 (FIG. 4). Such partition layers are connected electrically to the rail guide or to the ground. The partitions form the cathodes, while an electrode 55 immersed into the coagulate in front of the emersion station forms the anode and an electric current sent through the liquid in this manner exerts an electrical effect on the surface of the partition prior to emersion. This prevents the adhesion of particles of coagulate.

The invention is not restricted to the exemplified embodiment illustrated. In place of the central single-track rail guide one can thus also use a multirail guide placed on the sides of the container. Also the carriages may be replaced by sliding skids or the like. The return of the partitions may also be effected through other devices, such as band conveyor, oblique plane for automatic return of the carriages or the like.

Hydraulic cylinders 39, 40 are expediently replaced in such a case by other lifting and lowering elements, such as chain conveyors or the like, if the total height must be taken into consideration.

The liquid introduced into double-wall container 1 may also be used as a heat carrier, so as to warm the milk and the coagulate at the most advantageous temperature.

Figure 5:
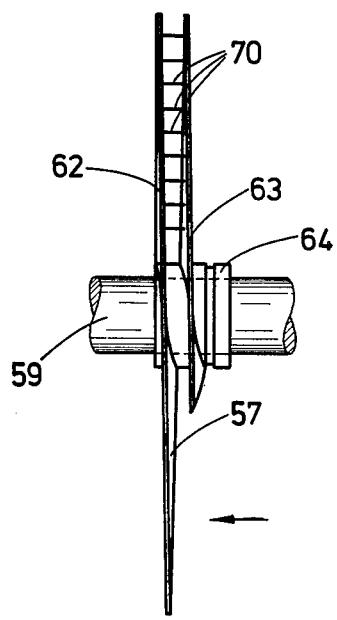
FIG. 5 shows an elevation of a cutting spiral.
Figure 6:
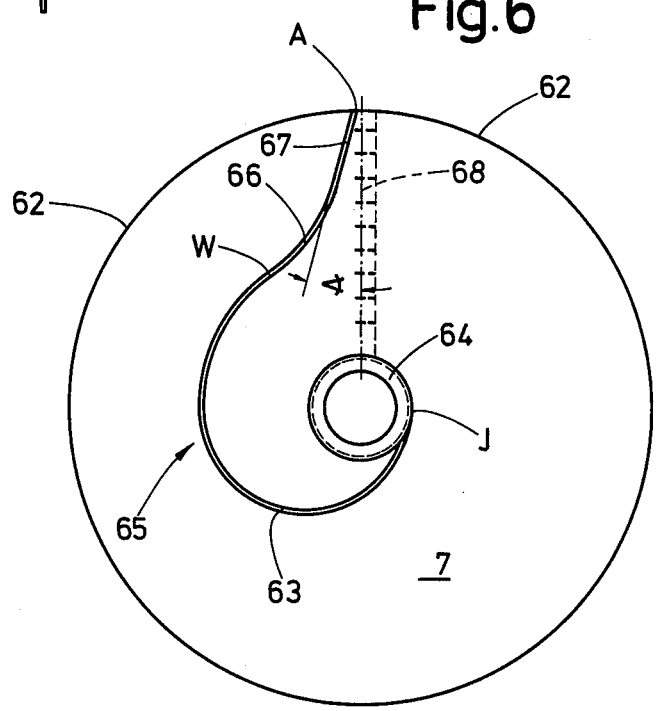
FIG. 6 shows a frontal elevation relating to FIG. 5.

Screw cutter 15 (FIG. 5) for cutting the coagulate, which is displaced at a constant relatively low velocity in the direction of the arrow, into disks or arc-of-circle prisms, is mounted on a driven shaft 59 extending in the direction of displacement of the coagulate at a sufficient height thereabove. According to the invention, screw cutter 15 consists of a full thread of a cutter blade 57. The thread with its peripheral edge 62 entirely fills out the trough of the container. A cutting edge 63 is used for cutting the coagulate. It joins peripheral edge 62 from a starting point A to an inner point J on the axis of rotation or a screw hub 64. Cutting edge 63 extends substantially in spiral shape. A cutting edge which has turned out as particularly advantageous possesses first of all a spiral shape 65 from inner point I to a turning point W situated approximately at the turning angle of 220°, which turning point is situated on a circle possessing approximately the half radius of cutter blade 57. The turning point is followed by a countercurve 66. The radius of curvature of the countercurve expediently corresponds to the radius of curvature of the spiral at its end. The countercurve then passes into a straight line 67, which meets the starting point at an angle of about 15° to a main vertical axis 68.

When a spiral cutting edge, in particular that of FIG. 2, is immersed into the coagulate or is present therein, it does not exert a detrimental pressure effect but performs a drawing movement, which secures a good and effective cut.

Figure 7:
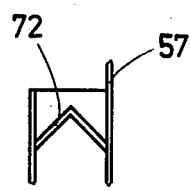
FIG. 7 shows a detail view of a cutting edge.

Besides, it has turned out as expedient to stretch longitudinally oriented cutting wires 70 between the ends of cutter blade 57, which wires also divide the strip of coagulate through longitudinal cuts. Cutting edges 72, shown in FIG. 7, are particularly advantageous in place of cutting wires 70. Such cutting edges make it possible to produce the arc-of-circle cheese-curd prisms that are desirable for many kinds of cheese. Such prisms are then still cut to a curd grain by means of a so-called longitudinal cutter.

The spiral shape of the screw cutter provides the possibility of a drawing application of the cutting edge to the coagulate, due to which a clean and sparing cut is obtained even at minimal cutting velocities. Accordingly, this screw cutter can also rotate at such a slow rate that the screw-shaped cutter blade adjacent the cutting edge does not exert an accelerating or retarding thrust effect on the travelling coagulate, even during continuous rotation in situ; rather, it can be precisely adapted to the velocity of the coagulate. Since the peripheral velocity of the cutting edge is greater outward, a steeper slope of the cutting edge is possible in such an area.

We claim:

1. A device for continuous production of cheese material through coagulation of milk comprising a horizontal trough-shaped container having edges and an inlet end and an outlet end, a flexible inner wall covering the container wall on the inside, which inner wall forms an endless band around the edges of the container, means feeding milk to the inlet end of the container, drive means urging the forward movement of the flexible inner wall at such a velocity that the milk coagulates on its way from the inlet end to the outlet end of the container, cutting means for the coagulate at the outlet end of the container, whereby said coagulate in the form of cut cheese curd is removed by the inner wall on the outlet side, partitions corresponding to the cross section of the container which are horizontally spaced in relation to each other, a rail guide for the partitions, means for lowering the partitions into the container at the inlet end, means for lifting the partitions from the container at the outlet end in front of the cutting device, and a return rail guide for the partitions, said return rail guide connecting the lifting means with the lowering means.

2. In a device according to claim 1, the improvement in which the rail guide and the return rail guide are arranged above the container between the lowering means and the lifting means.

3. In a device according to claim 2, the improvement in which the rail guide is arranged at such a distance above the movable inner wall that the partitions guided in the rail guide press on the movable inner wall.

4. In a device according to claim 1, the improvement in which the partitions include electrically conductive material and an electrode is immersed in the coagulate a short distance in front of the partitions, to establish an electrical current between the electrode and the partitions.

5. In a device according to claim 1, the improvement in which the means for lowering and lifting the partitions are formed by vertical guide channels, said guide channels being arranged at the ends of the rail guide and the return rail guide, whereby in these guide channels, rail extensions are lifted and lowered.

6. In a device according to claim 5, the improvement in which the partitions are attached to a carriage with rollers on axles, the carriage rollers being guided between an upper and a lower pair of rails of the rail guide.

7. In a device according to claim 6, the improvement in which a pan is provided below the return rail guide and above the rail guide and cleaning compartments for the partitions are formed in said pan.

8. In a device according to claim 1, the improvement in which the container is made with double walls for the purpose of containing a liquid and its inner jacket possesses perforations for a limited discharge of the liquid.

9. In a device according to claim 1, the improvement in which the cutting means is formed by a screw cutter which is rotatable about an axis arranged parallel to the longitudinal axis of the container and above the coagulate, the cutter blade of the screw cutter forming compartments which divide the filling space of the container, and the cutting edge of the screw cutter having the form of a spiral.

* * * * *